No. 848,966. PATENTED APR. 2, 1907.
N. A. CARLSON.
FRUIT AND VEGETABLE CLIPPER.
APPLICATION FILED JULY 27, 1906.

WITNESSES:

Nels A. Carlson,
INVENTOR.
By C. A. Snow & Co
ATTORNEYS

UNITED STATES PATENT OFFICE.

NELS A. CARLSON, OF HALLANDALE, FLORIDA.

FRUIT AND VEGETABLE CLIPPER.

No. 848,966. Specification of Letters Patent. Patented April 2, 1907.

Application filed July 27, 1906. Serial No. 328,108.

*To all whom it may concern:*

Be it known that I, NELS A. CARLSON, a citizen of the United States, residing at Hallandale, in the county of Dade and State of Florida, have invented a new and useful Fruit and Vegetable Clipper, of which the following is a specification.

This invention relates to fruit and vegetable clippers.

During an experience of many years in the fruit and vegetable business I have discovered that it is difficult to cut and handle fruit and vegetables properly while one of the hands is restricted in its movement by the vegetable or fruit clipper, which, as is well known, is usually either strapped to the hand or held loosely upon one finger, so as to be engaged and manipulated by one of the other fingers.

The object of my invention therefore is to provide a strong, simple, durable, inexpensive, and thoroughly efficient fruit-clipper having means for securing one of its blades upon one joint of the forefinger in such manner that the handle of the other blade will be held in position to be engaged by the thumb, so as to manipulate the clipper without in any way interfering with the free action of the other fingers of the hand.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of the following claims without departing from the spirit of the invention or sacrificing any of its advantages.

Figure 1:
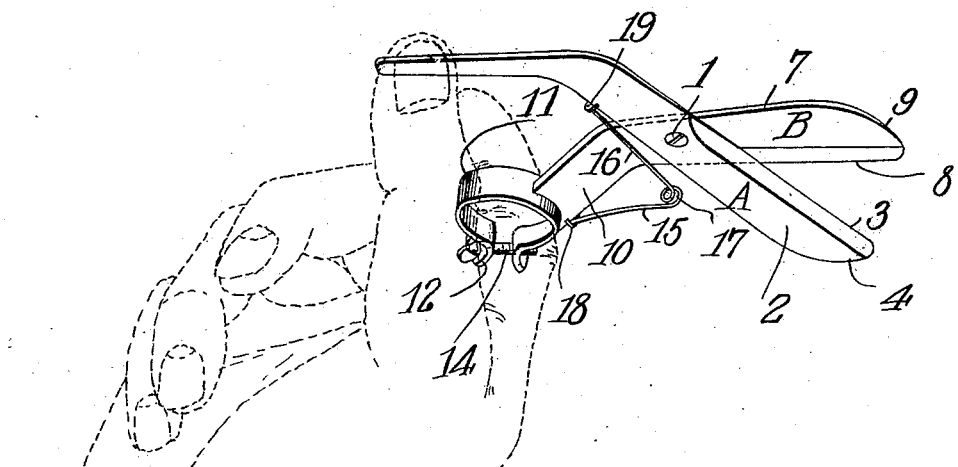
Figure 2:
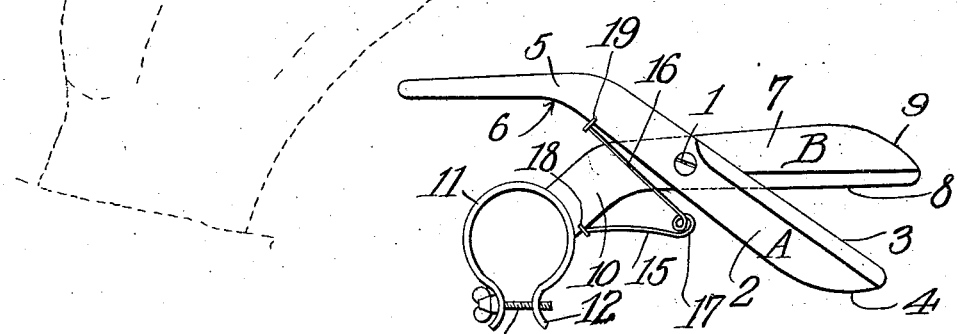

In the accompanying drawings, forming part of this specification, Figure 1 is a perspective view showing the manner of using the improved fruit and vegetable clipper of this invention. Fig. 2 is a side elevation of the device.

Like reference-numerals indicate corresponding parts in the different figures of the drawings.

The improved fruit and vegetable clipper of this invention preferably comprises two members A and B, which cross each other intermediate their ends and are pivotally connected, as indicated at 1. The member A is provided with a blade portion 2, having a sharp edge 3 and a curved rear edge 4.

The handle portion 5 of the member A is tapered and bent inwardly at an angle, as indicated at 6.

The member B is provided with a blade 7, having a cutting edge 8 and a curved back 9. The handle portion 10 of the member B is provided with a split finger-loop, the resilient arms 11 and 12 of which are flattened out in cross-section, as shown, so as to provide broad contact-surfaces for engagement with one joint of the forefinger.

The resilient arms of the finger-loop are adapted to be adjusted toward or from each other by means of an adjusting-screw 14, so that when the forefinger has been passed into the space between the arms the screw 14 can be adjusted to cause the arms to clamp the finger with the proper degree of rigidity. The finger-loop is preferably broad enough to prevent the same from interfering unduly with the free circulation of blood through the finger, and in some cases said loop may be broad enough to cover practically the entire middle joint of the forefinger, so that any lateral movement of the blades 2 and 7 with respect to the joint of the forefinger will be prevented. When the adjusting-screw 14 is properly tightened, the blade 7 will be held in proper position with relation to the finger so that the handle 6 of the member A will be always disposed in proper position to be engaged by the thumb when it is desired to clip the stem or other part of a fruit or vegetable.

The means for holding the blades 2 and 7 normally separated consists, preferably, of a spring having converging arms 15 and 16, which are integrally connected with each other by the resilient coils 17. The arm 15 is connected with the outer edge of the member B, as indicated at 18, and the arm 16 is connected with the inner edge of the member A, as indicated at 19. This arrangement of the spring permits the handle portion 5 of the member A to overlap the handle 10 of the member B when the two handles are drawn together by depressing the thumb.

The improved fruit and vegetable clipper of this invention is strong, simple, durable, and inexpensive in construction, as well as thoroughly efficient in operation.

What is claimed is—

1. A fruit and vegetable clipper comprising a pair of members crossing each other intermediate their ends and being pivotally connected, one of said members having its handle end bent outwardly and provided with a split finger-loop the adjacent ends of which are spaced apart to form clamping-arms adapted to engage the forefinger, said loop being provided with an adjusting-screw extending through the arms of the loop, and the other member having its handle end bent inwardly and tapered, and a spring comprising a pair of converging arms resiliently connected together, one of said arms being attached to the outer edge of one of said members and the other of said arms being secured to the inner edge of the other of said members.

2. A fruit and vegetable clipper comprising pivotally-united cutting members each having one end thereof extended beyond its pivot-point to form an integral operating-handle, a finger-loop carried by one of said arms and adapted to engage the forefinger, the adjacent handle being extended beyond and over the finger-loop for engagement with the thumb, and a spring comprising a pair of converging arms one of which is secured to the outer edge of one operating-handle and the opposite arm to the inner edge of the adjacent handle.

In testimony that I claim the foregoing as my own I have hereto affixed my signature in the presence of two witnesses.

NELS A. CARLSON.

Witnesses:
C. F. SEARLE,
J. V. CYREEN.